(Model.)
G. F. EBERHARD.
TRACE CARRIER.
No. 255,382. Patented Mar. 21, 1882.
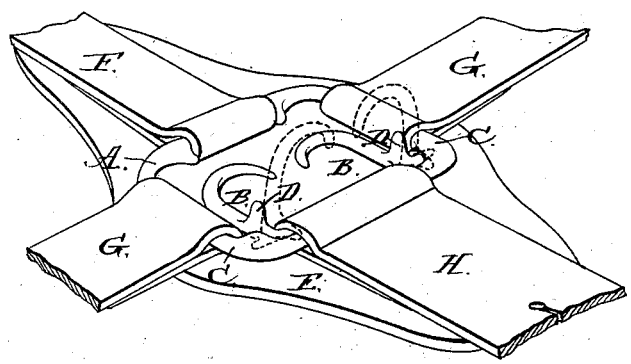
WITNESSES
John A. Ellis
Philip C. Mase
INVENTOR
Geo. F. Eberhard,
by Anderson & Smith
his ATTORNEYS

UNITED STATES PATENT OFFICE.

GEORGE F. EBERHARD, OF CLEVELAND, OHIO, ASSIGNOR TO THE EBERHARD MANUFACTURING COMPANY, OF SAME PLACE.

TRACE-CARRIER.

SPECIFICATION forming part of Letters Patent No. 255,382, dated March 21, 1882.

Application filed July 30, 1881. (Model.)

*To all whom it may concern:*

Be it known that I, GEORGE F. EBERHARD, a citizen of the United States, residing at Cleveland, in the county of Cuyahoga and State of Ohio, have invented certain new and useful Improvements in Trace-Carriers; and I do hereby declare the following to be a full, clear, and exact description of the invention, such as will enable others skilled in the art to which it appertains to make and use the same, reference being had to the accompanying drawing, and to letters or figures of reference marked thereon, which form a part of this specification.

The figure of the drawing is a representation of a perspective view of my device.

This invention is designed as an improvement on Patents No. 198,295, of December 18, 1877, and No. 243,887, of July 5, 1881, for trace-carriers; and it consists in a frame provided with a double hook having its base pivoted in the side bars of the frame parallel to the rear bar of the frame, and having projecting studs rising from the bases of the arms of the double hook, whereby the latter may be raised to permit the cockeyes to be hooked thereto, as will be hereinafter fully described, and particularly pointed out in the claim.

Referring by letter to the accompanying drawing, A designates the frame of the trace-carrier, and B designates the double hook, having its base pivoted in the side bars, C, of the carrier-frame.

Immediately forward of the base-bar of the double hook, and rising from the arms of the same, are two rounded studs, D D, by which when either of them is pressed upon the double hook may be raised to permit the engagement of the cockeyes.

E designates the base-strap; F, the back-strap; G G, the hip-straps, and H the crupper-strap.

The advantages of this trace-carrier are obvious. It lies flat and does not show, excepting when in use to carry the cockeyes. Being compact, with no sharp points projecting, it is impossible for the reins or the horse's tail to catch therein. The cockeyes are easily adjusted and cannot come off of themselves, and there are no springs to become rusty or broken, thereby rendering the carrier useless.

A double hook held in place by a spring or by the friction or spring of the lugs is not new in trace-holders. A trace-holder the frame of which is provided with sockets or recesses at the ends of its rear bar and a double hook with pivots at its rear corners, to adapt the frame and double hook to be held in connection with the crupper-strap, is also old and is not claimed herein. Protection is only asked for the construction hereinafter specifically claimed.

Having thus fully described my invention, what I claim as new, and desire to secure by Letters Patent, is—

In a trace-carrier, the combination, with the carrier-frame A, of the pivoted double hook B, provided immediately in front of its base-bar, and rising from the arms of the hook with the rounded vertical studs D D, whereby the double hook may be turned up to receive the cockeyes, substantially as specified.

In testimony whereof I affix my signature in presence of two witnesses.

GEO. F. EBERHARD.

Witnesses:
H. CLARK FORD,
LEWIS W. FORD.